Patented May 31, 1949

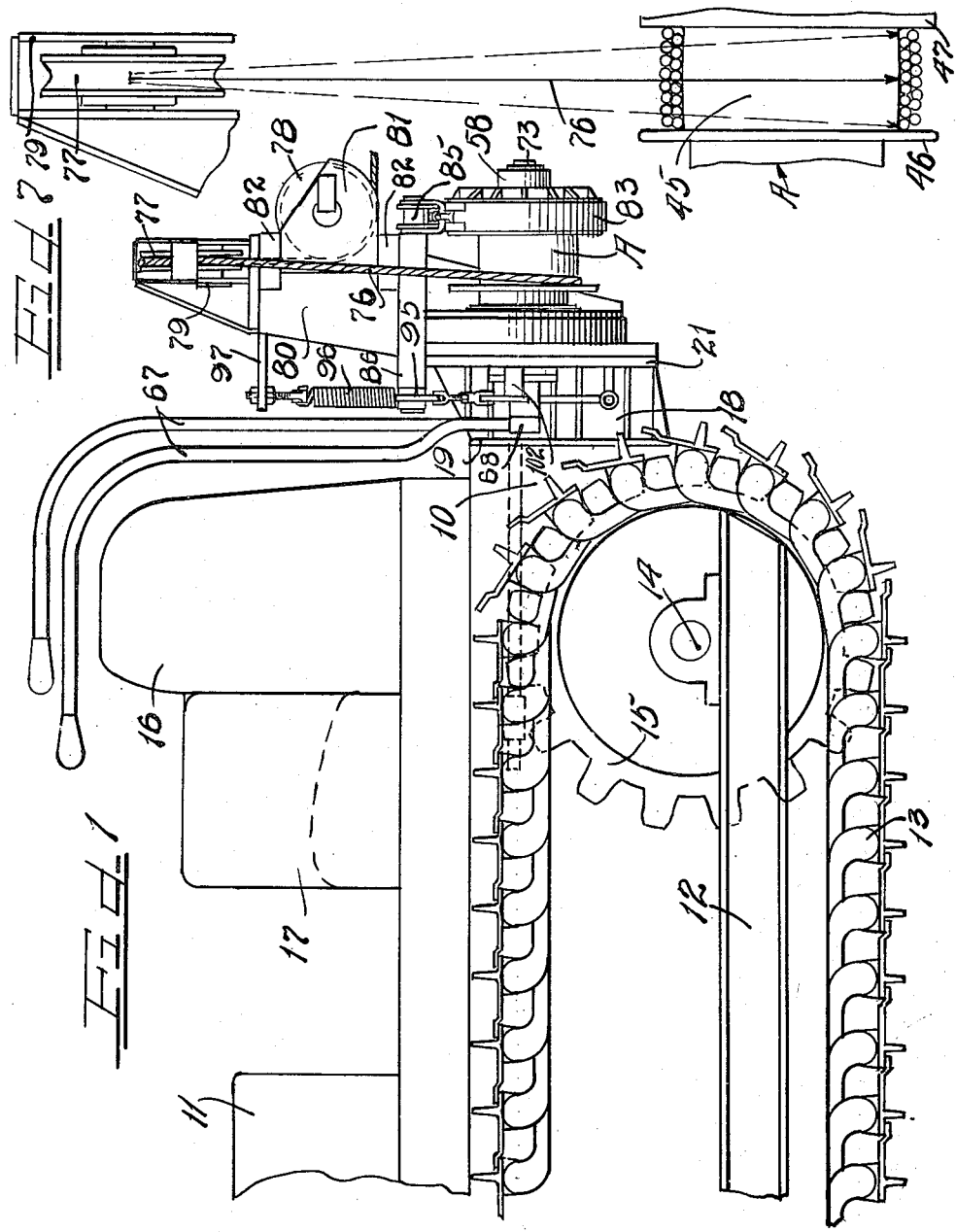

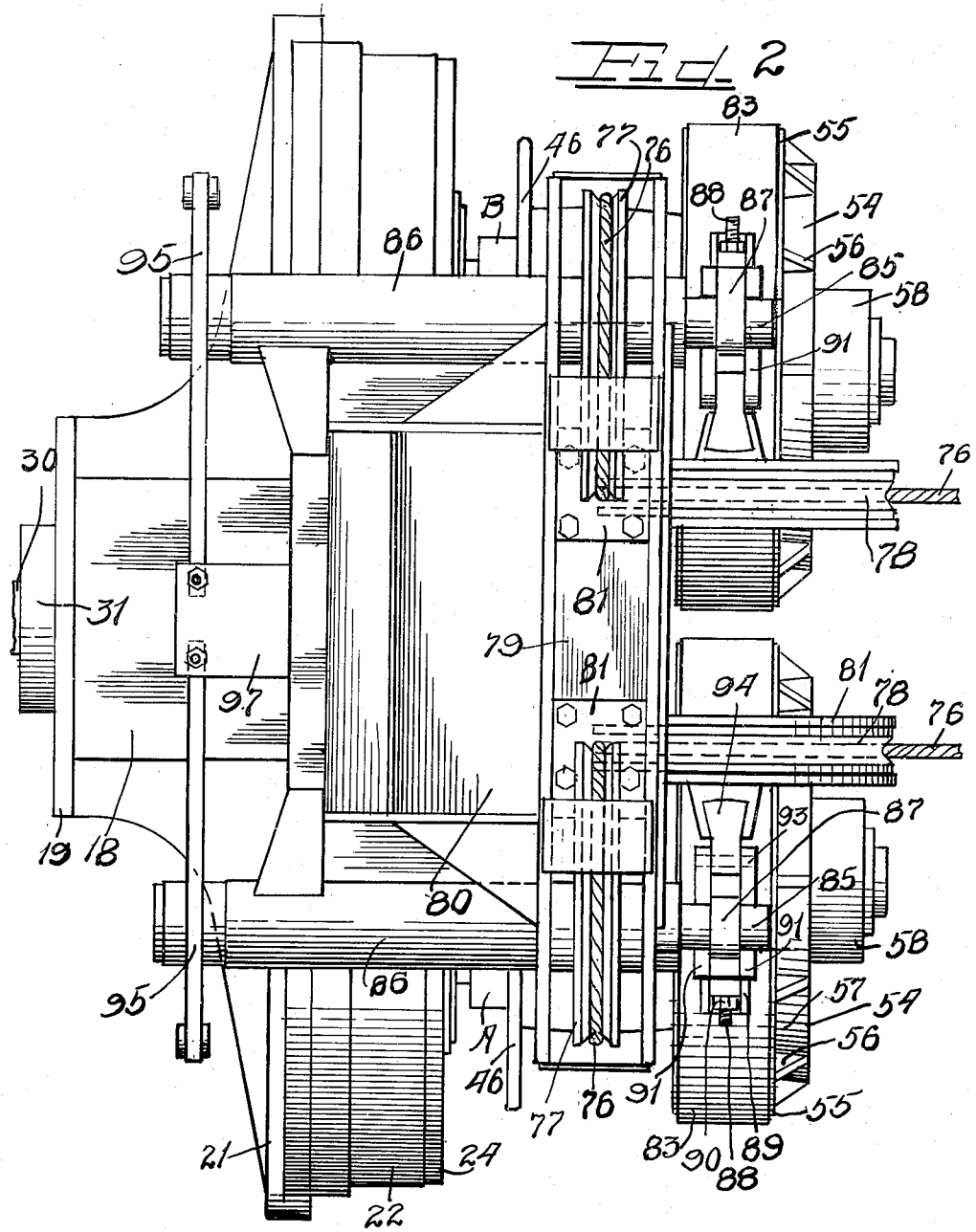

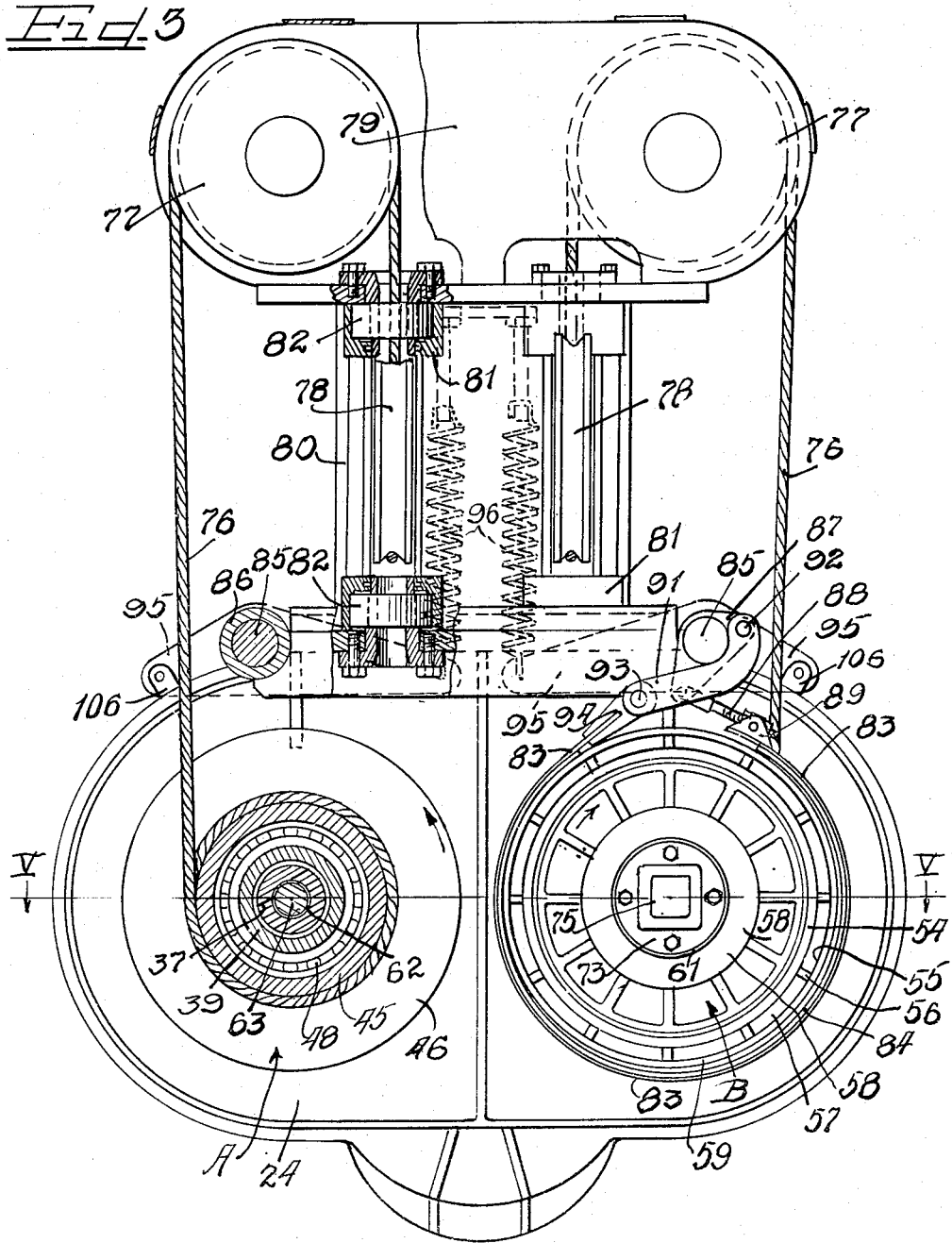

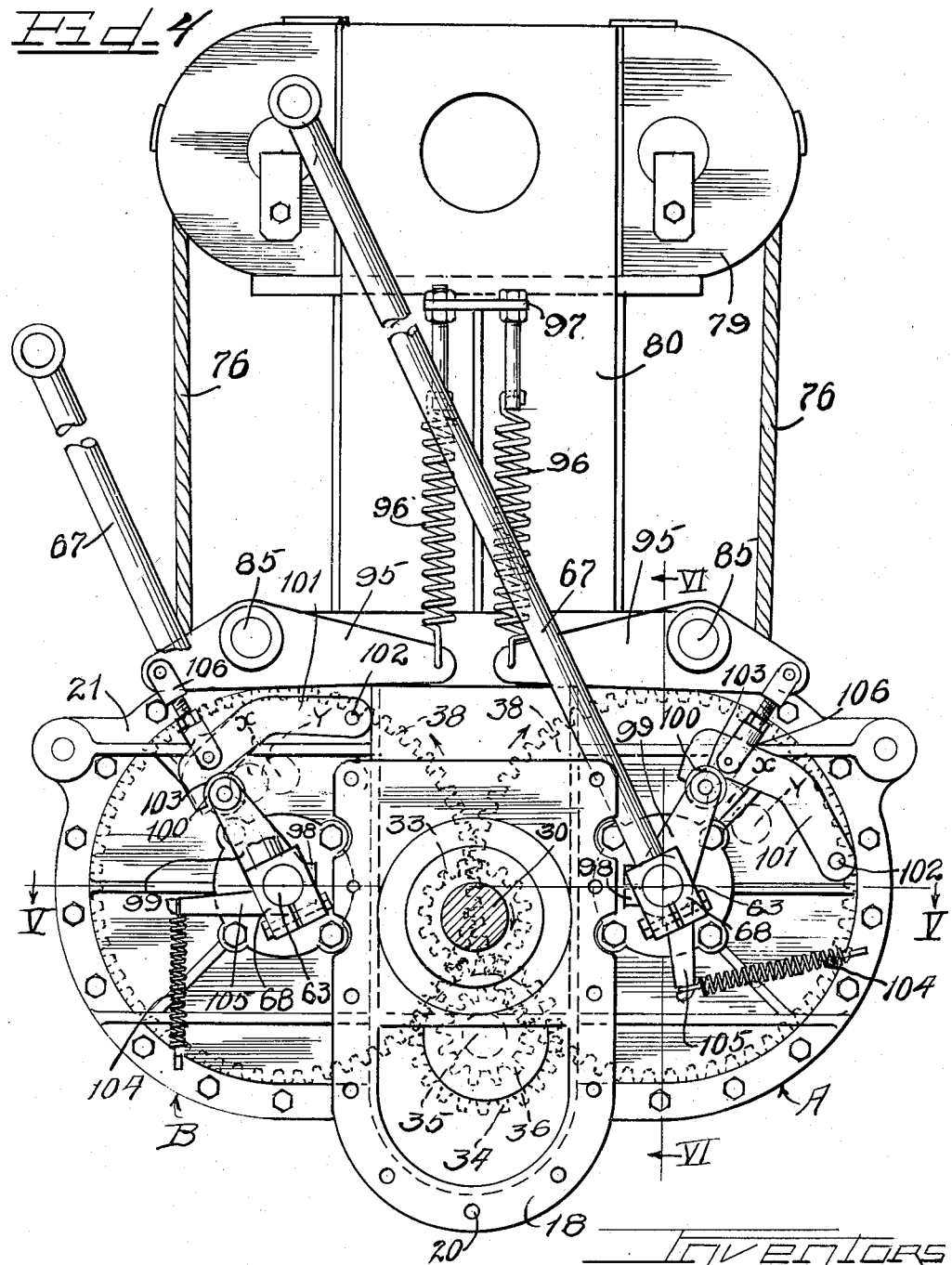

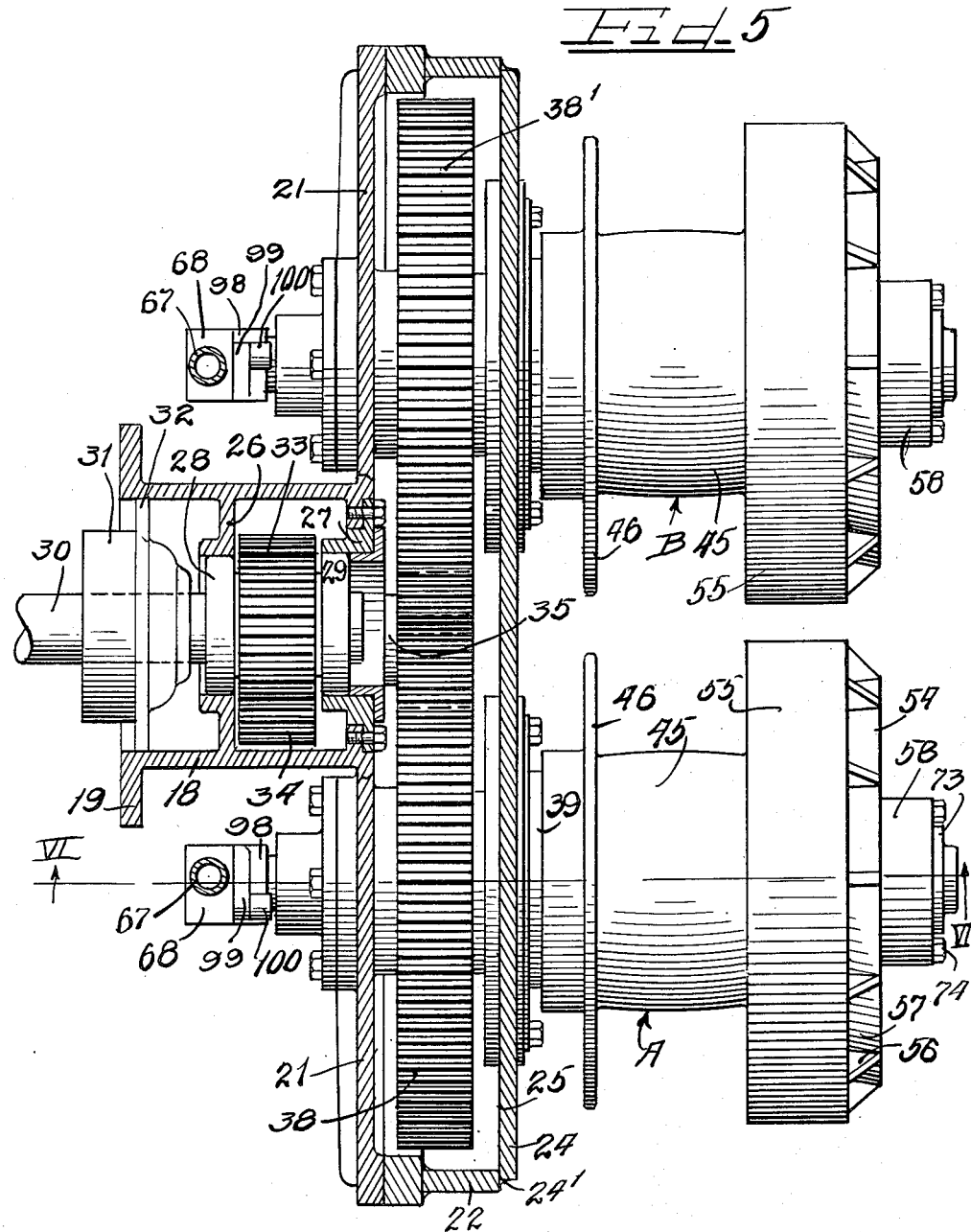

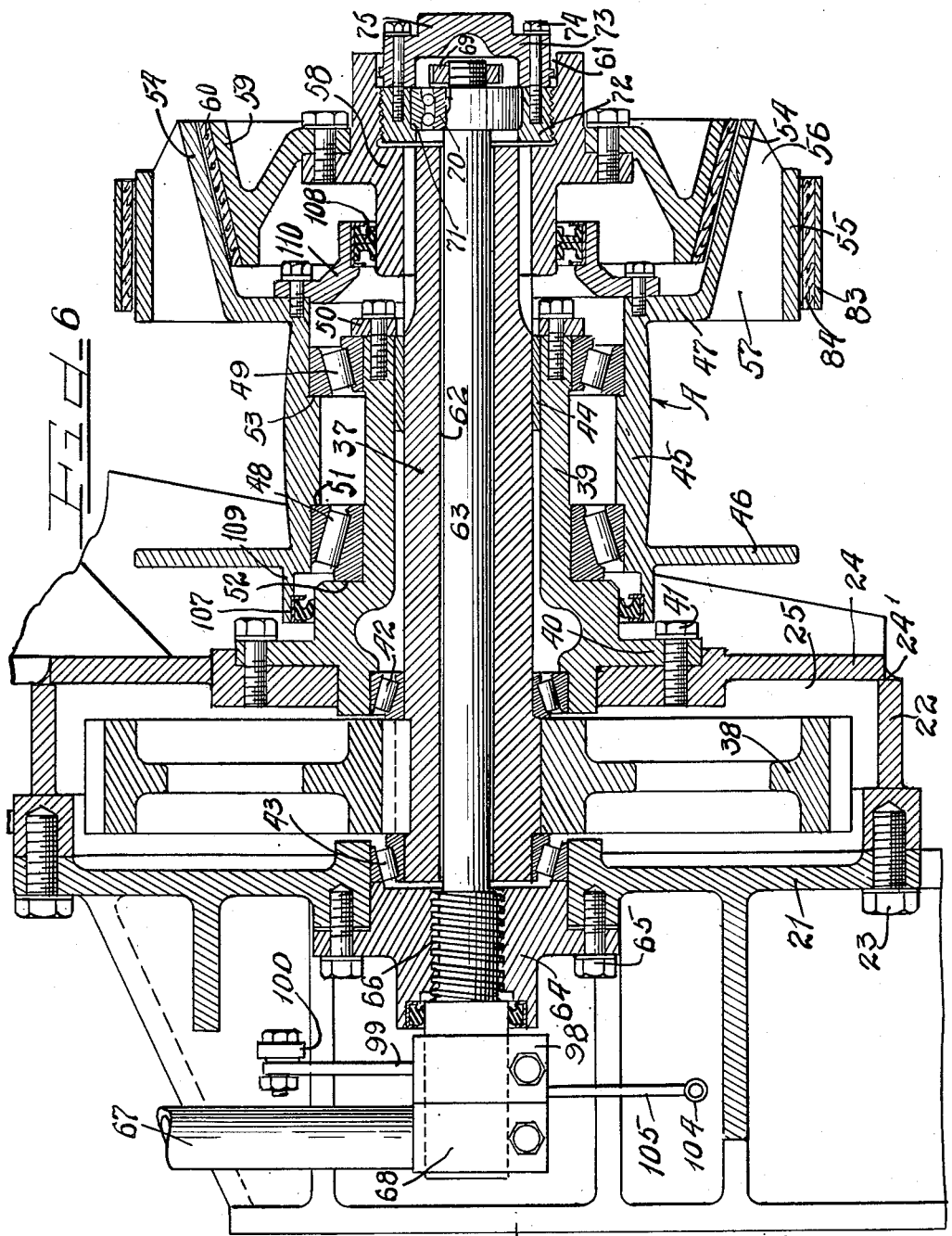

2,471,988

UNITED STATES PATENT OFFICE 2,471,988

WINCH

Harry H. Washbond and Orville R. Beattie, Springfield, Ill., assignors to The Baker Manufacturing Company, Springfield, Ill., a corporation of Illinois Application March 20, 1944, Serial No. 527,164

8 Claims. (Cl. 254—187)

This invention relates to power control units and particularly to a unitary winch structure adapted to be mounted on vehicles, such as tractors, to control the operation of structures mounted on the tractor or whose operation is to be controlled from the tractor.

An important object of the invention is to provide an efficient unitary winch structure of the double cable drum type readily attachable to the rear end of a vehicle for power operation from the vehicle engine, and with the drums and associated clutch and brake structures alike and independently controllable.

A further object is to produce a unitary winch structure in which two like assemblies each comprises a brake drum and associated clutch and brake mechanism, and with each assembly provided with a control lever for control of the respective clutch and brake mechanism, and with the control movements of the two control levers being all in the same direction for the same clutch and brake control.

Still a further object is to provide arrangement in which the two drums rotate relatively in opposite directions and are therefore provided with right and left hand brake mechanism, but with cam controlled release mechanism operable by the control levers in such manner that both control levers travel in the same direction to positively release the respective brake bands, and with the control levers connected with the respective clutch mechanisms in such manner that both levers travel in the same direction for setting of the clutches after setting of the brakes, and in the opposite direction to release the clutches and to release the brakes.

Another object is to provide a bearing support for each cable drum extending directly from the winch housing which is secured to the vehicle, and with a clutch and brake assembly carried by the outer end of each cable drum, and with the drive shaft for the clutch extending through the bearing support for the drum.

Still another object is to provide a hollow drive shaft for the clutch through which extends the clutch control shaft coupled at its outer end to the outer end of the clutch head.

Still a further object is to provide an adjustable coupling between the outer end of the clutch control shaft and the clutch head and with the coupling readily accessible for adjustment for clutch head setting or for compensation for clutch wear.

Another object is to provide webs between a clutch drum and a brake drum concentric therewith, with the webs functioning as vanes for creating air flow between the clutch drum and brake drum for dissipation of heat caused during braking and clutching action.

The above referred to and other features of the invention are embodied in the structure shown on the drawings, in which Figure 1 is a side elevation of the rear portion of a tractor with the winch unit mounted thereon;

Figure 2 is an enlarged plan of the winch structure;

Figure 3 is a rear elevation of the winch structure, partly in section;

Figure 4 is a front elevation of the winch structure;

Figure 5 is an enlarged section on plane V—V, Figures 3 and 4, with parts in plan;

Figure 6 is an enlarged section on plane VI—VI, Figures 4 and 5; and

Figure 7 is a fragmentary side elevation of one of the cable drums and its cable receiving guide sheave.

The tractor shown is of the crawler or tracklaying type and comprises the body 10 mounting an engine 11. The track frames 12 mount the tracks 13, and are mounted at the opposite ends of the driving axle structure 14 on which the rear end of the frame 10 is supported, the shaft operating the sprockets 15 by which the tracks 13 are driven. On the rear end of the body is mounted a structure such as a fuel tank 16 in front of which is the seat structure 17.

The supporting frame structure for the winch operating part comprises the vertically oblong hollow frame part 18 having the flange 19 around its inner end provided with bolt holes 20 (Fig. 4) whereby the frame structure may be attached to the rear end of the tractor body, as shown on Figure 1. At its outer end the frame part 18 supports the horizontally oblong wall 21 to which a peripheral wall 22 is detachably secured as by screws 23 (Fig. 6). A wall 24 parallel with the wall 21 is secured to the outer end of the peripheral wall 22 as by welding 24', the walls 21, 22 and 24 defining the gear chamber 25.

The hollow frame part 18 has inner and outer cross-walls 26 and 27 for receiving anti-friction bearings 28 and 29 for the drive shaft 30 which extends into the tractor body for coupling connection with the engine to be driven thereby. A bearing and sealing structure 31 mounted on the tractor receives the shaft and has a guide or pilot wall 32 for extending into the frame part 18, as shown on Figure 5. Between the bearings 28 and 29 the shaft 30 mounts the gear pinion 33 which meshes with a larger gear pinion 34 mounted on the inner end of a shaft 35 which is journalled below the shaft 30 in the cross-walls 26 and 27 and extends into the gear chamber 25 and mounts a pinion 36, as shown on Figure 4.

Two winding drum structures A and B are provided for the winch structure whose driving and control elements are substantially identical. Each drum structure is concentric with a driving shaft 37 extending through the chamber 25 at each side thereof. Figure 6 is a cross-section through the drum structure A and its driving and control structures. The shaft 37 for this drum structure has keyed to its inner end the gear 38, while the shaft 37 for the cable drum structure B is keyed to the gear 38' in the chamber 25. The gears are of the same size and mesh with each other, the pinion 36 meshing with the gear 38 so that upon rotation of the drive shaft 30 the two gears will be power rotated in opposite directions as indicated by the arrows on Figure 4.

Referring to Figure 6, each shaft 37 extends outwardly through a tubular bearing wall 39 secured by its flange 40 to the wall 24 of the chamber 25, as by screws 41. At its inner end the wall 39 mounts a roller bearing 42 for the shaft 37, and the roller bearing 43 supported by the wall 21 of the chamber 25 receives the inner end of the shaft 37, these bearings functioning as support and thrust bearings for the shaft. A bushing 44 is shown inserted in the outer end of the frame 39 to serve as additional bearing and alinement support for the shaft 37.

The cable drum hub or barrel 45 has the inner flange 46 and the outer flange structure 47 and is journalled on the wall 39 by inner and outer thrust bearing assemblies 48 and 49. A plate 50 secured to the outer end of the wall 39 holds the inner bearing 48 between the shoulder 51 on the drum and the shoulder 52 of the wall 39, and the outer bearing 49 between the drum shoulder 53 and the plate, the drum being thus mounted by the thrust bearings against axial movement thereof on the supporting wall 39.

Forming part of the outer flange structure or head 47 of the cable drum is the frusto-conical or outwardly flared wall 54 forming a clutch drum, and the surrounding annular wall 55 forming a brake drum. Between these walls extend webs 56 which function as vanes for creating air flow through ventilating passageways 57 for dissipating heat caused by the brake and clutch friction.

The clutch head comprises the hub 58 splined to the outer end of the shaft 37 for axial movement thereon. Secured to this hub is the frusto-conical clutch ring or cone 59 faced with friction material 60 for engaging the inner surface of the clutch drum 54. At its outer end the hub has the bore 61, and the shaft 37 has the bore 62 therethrough, and extending through the bore 62 and terminating in the bore 61 is the clutch operating shaft 63. At its inner end the shaft extends through a bearing block 64 detachably secured by screws 65 to the inner wall 21 of the gearing chamber 25, the shaft having the left hand threading 66 engaging companion threading in the bearing block, and outside of the bearing block a control lever 67 is adjustably secured to the shaft by a split clamping sleeve 68.

Secured to the outer end of the shaft 63 by a nut 69 is the inner ring of a double-row ball bearing whose outer ring 71 seats in the annular adjusting nut 72 having threaded engagement in the bore 61 of the clutch hub. A cap 73 is detachably secured to the threaded adjusting ring 72 by screws 74, the cap engaging the outer bearing ring 71 to hold it to the adjusting ring. With the arrangement shown, when the control lever 67 is swung for rotation of the shaft 63, the threading engagement of the shaft with the bearing block 64 will cause axial movement of the shaft and axial movement of the clutch hub. The threading 66 being left-handed, when the lever is swung in clockwise direction, Figure 4, the shaft 63 will be moved axially inwardly for clutch engagement of the clutch cone 59 with the clutch drum 54 for rotation of the respective cable drum. When the lever is rotated in the opposite direction, the shaft 63 will be moved axially outwardly for release of the clutch. The axial thrust of the shaft 63 is transmitted to the clutch hub through the double-row ball bearing and by rotating the adjusting nut 72 the shaft 63 may be adjusted axially relative to the clutch hub for setting of the clutch cone 59 relative to the clutch drum 54, or for compensating for wear of the clutch friction material 60. Adjustment of the nut 72 can be readily accomplished by the application of a tool to the polygonal boss 75 on the cap 73.

Each of the drums of the assemblies A and B receives a cable 76 which engages around a guide sheave 77 for travel around a fairlead sheave 78 to structures to be operated or controlled by the winch mechanism. The sheaves 77 are journalled in a housing 79 at the top of a tower 80 on the drum supporting frame structure. Each sheave 78 is journalled in the forward part of a frame 81 which is hinged at the top and bottom by ball bearing connections 82 to the tower structure 80 on an axis tangent to the groove of the corresponding guide sheave 77 so that during pay-out of cable from a drum or wind-up thereof the frame with the sheave 78 therein may swing laterally to follow the angle of lead of the cable. Referring to Figures 1 and 7, the barrel 45 of the cable drums is crowned to such radius that, as the angle of the cable between the drum and the corresponding guide sheave 77 changes during operation of the drum, the distance between the surface of the barrel and the sheave remains constant so that the tension of the cable cannot suddenly vary, and the cable will spool closely together onto the drum with even layers and without crossing of cable turns on the drum. As indicated in Fig. 7 the sheave 77 has some side play on its mounting so that the cable will not overrun the groove of the sheave when winding on or unwinding from the ends of the drum as shown by the broken lines.

Describing now the braking mechanism and control, a brake band 83 surrounds the brake drum 55 on each cable drum and has friction lining 84 for engagement with the brake drum. Referring to Figures 1 to 4, a brake shaft 85 above each of the brake structures is journalled in a sleeve bearing 86. At its outer end each shaft has a triangular lever plate 87 secured thereto, the lower corner of this lever plate being connected by an adjustable link 88 with the live end of the brake band 83. As shown, the outer end of the link is pivoted to the lever plate and its inner end is threaded to extend through a bracket 89 on the brake band to receive a nut 90 by which the link may be adjusted. The opposite corner of the lever plate 87 is connected by a link structure 91 with the dead end of the brake band. As shown on Figures 2 and 3, the link structure 91 is L-shaped and may comprise two L-shaped members straddling opposite sides of the lever plate 87 to be pivoted to the upper corner thereof by a pin 92. The opposite ends of the link members are connected by a pin 93 with a fitting 94 secured to the dead end of the brake band. Referring to Figure 3, when the cable drum of the assembly B is winding up it is rotated in clockwise direction and when the cable drum of the assembly A is winding up it rotates in counter-clockwise direction, as indicated by the arrows. When the brake shaft 85 for the assembly B is rotated in counter-clockwise direction the brake will be released and when rotated in the opposite direction the brake will be applied and set. The application and setting of the link is by spring power. Mounted on the inner end of each shaft 85 is a brake lever 95 whose inner end is engaged by a tension spring 96 anchored to an arm 97 extending from the tower structure 80. This spring tends at all times to rock the lever 95 for rotation of the shaft 85 for setting of the brake. As will be described later, means under control of the control levers 67 are provided for positively releasing the brakes, Figure 3, showing the released position of the brake band for the assembly B. It will be noted that the dead-end link 91 passes under the shaft 85 from its pin connection 92 with the lever plate 87 so that a line extending through this pin connection and the pin connection 93 is below the line extending through the connection 93 and the center of shaft 85. With this arrangement leverage is added to assist the spring 96 in holding the brake set against unwinding of the cable drum by pull of a load or weight on the cable when the clutch is released. This leverage effect will increase as the brake band wears or stretches thus assuring at all times sufficient braking power from the spring 96.

The mechanism for controlling the positive release of the brake structure is best shown on Figure 4. On the inner end of each shaft 63 is clamped a split hub 98 from which a cam arm 99 extends upwardly and terminates in a cam roller 100. A cam lever 101 is provided for each cam roller and is pivoted on the frame wall 21 as indicated at 102. In the position shown on Figure 4, the cam lever 101 for the assembly B extends horizontally outwardly from its pivot 102 and then inclines downwardly, while the cam lever 101 for the assembly A extends diagonally upwardly from its pivot 102 and then inclines laterally inwardly, the cam roller for each lever being within a notch 103 in the lower edge of the lever at the end thereof. The cam levers are then in their upper positions, and springs 104 between the frame wall 21 and arms 105 on the hubs 98 tend to hold the cam arms in such position and with the control levers 67 for the two assemblies A and B swung to the left from a neutral position, as shown on Figure 4. With this position of the control levers the respective clutch operating shafts 63 will be in axial position to disengage the respective clutches.

An adjustable reach link 106 is pivoted at its outer end to the outer end of the corresponding brake lever 95 with whose inner end the spring 95 is connected, and the inner end of the link is pivoted to the inclined end of the corresponding cam lever 101 opposite the notch 103 therein. Upon swing of either control lever 67 to the left from neutral position to the position shown on Figure 4, the upward swing of the cam lever 101 by the cam roller causes the corresponding lever 95, through the link connection 106, to be rotated to swing its inner end downwardly for rotation of the corresponding shaft 85, against resistance of the spring 96, to rotate the lever plate 87 for releasing of the corresponding brake. Figure 3 shows the brake for the assembly B released by the rotation of the shaft 85 when the cam lever 101 was swung upwardly by setting of the corresponding control lever 67 to the left from neutral. Looking at Figure 4, such rotation of the shaft 85 was in clockwise direction, and looking at Figure 3, the rotation was in counter-clockwise direction. Such release of the brake mechanism is thus positively accomplished, and with the positions of the control levers as shown on Figure 4 the clutches will be out and the brakes will have been positively released against the pull of the springs 96 tending to apply the brakes.

The clutching and braking operations for the assemblies A and B are independently controllable by manipulation of the respective control levers 67. The position of the levers shown on Figure 4 is the pay-out position, both the brake and the clutch being released so that a cable can be pulled out freely for unwinding of the drum and connection of the cable with the structure or object which is to be operated or controlled. When a control lever is swung a distance toward the right (Figure 4) the corresponding clutch control shaft 63 will be rotated for inward shift of the shaft to move the clutch head cone toward the clutch drum 54 (Figure 6), and with such swing of the lever the corresponding cam roller 100 will be moved out of the cam lever notch 103 to a neutral position X Figure 4, and the cam lever, under force of the corresponding spring 96, will be swung downwardly to follow the cam roller as shown by the dotted lines Figure 4, and the brake will become set. After setting of the brake, there will be no further down swing of the cam lever, and as the control lever is swung toward the right from neutral, the cam roller will become free of the cam lever, as indicated by Y Figure 4, and the clutch controlling shaft may be shifted for the desired pressure setting of the clutch and tension on the cable for operation of the structure to be controlled. Thus, with the arrangement shown, a control lever 67 may be swung to the right (Figure 4) toward a neutral position while the clutch cone is being drawn in from open position to a neutral position ready to grab the clutch drum, and during such swing of the control lever the corresponding cam lever 101 will be released for sufficient down swing for operation of the spring 96 for application of the brake band to the brake drum for sufficient braking of the pay-out cable to prevent too rapid pay-out rotation of the cable drum which might result in tangling of the cable. However, upon further swing of the control lever toward the right from neutral position, the cam lever 101 will be released for full brake setting by the time that the clutch has been brought into full clutch engagement with the clutch drum and then, while the cam roller is free of the cam lever, the clutch may be set for any clutch pressure engagement desired. When the control lever is swung back toward the left (Figure 4) from a clutching operation, the cam roller will reengage with the cam lever only after the clutch has been returned to its neutral position of just being released from the clutch drum, and then upon final swing of the operating lever to the left, the clutch will be fully disengaged and the brake will have been positively released.

When a clutched-in brake drum has been operated by power from the tractor engine through the transmission gearing described, to apply cable power to a load or other structure to be operated, and the clutch is then disconnected, the brake will hold the drum against unwinding under back-pull of the load until the brake is released. Referring to Figure 3, suppose that the clutched-in cable drum of the assembly B was winding up the cable 76 and the brake band was set, then, after disconnection of the engine power from the clutch, the back-pull of the load on the cable 76 would tend to rotate the cable drum in counter-clockwise direction to cause counter-clockwise drag on the brake band 83. However, such dragging force would act through the link 91 on the lever plate 87 to rotate this plate in clockwise direction to effect pull on the live end of the brake band without releasing the dead end of the band to which the link 91 is connected, and this leverage will assist the spring 96 in holding the brake band in tight engagement with the brake drum to hold the load on the cable. With this brake leverage afforded by the arrangement of the brake band link 91 relative to the lever plate 87, a lighter spring 96 could be used than would be necessary if the brake linkage did not afford such additional brake leverage.

The thrust bearings 48 and 49 for the cable drum are protected from dust and dirt and the weather by sealing gaskets or rings 107 and 108. The gasket 107 is located between the base of the bearing extension 39 and the flange 109 on the drum, the gasket 108 being located between the clutch hub 58 and the annular bracket 110 secured to the drum.

Briefly reviewing the operation of the winch structure, suppose that the cable from the drum of the assembly B were to be used for raising a load. The corresponding control lever 67 would be swung to the left, as shown on Figure 4, positioning the cam roller 100 in the notch 103 for release of the brake and unscrewing the shaft 63 (Fig. 6) for release of the clutch. The cable would then be free to be paid out for application to the load, and, without engaging the clutch, the operator could swing the control lever a short distance toward the right to position the cam roller at "X" for enough brake application on the drum to keep the cable taut. With the cable now attached to the load, the operator will swing the lever further to the right into a neutral position for full setting of the brake (cam roller 100 released from lever 101) by power of the spring 96 and to bring the clutch into position just short of grabbing the clutch drum, then upon further swing of the control lever to the right (cam roller position "Y" or beyond) the clutch will be brought into engagement for operation of the cable drum to raise the load. While the brake is "on" when the clutch is engaged, rotation of the brake drum 55 by the clutch is in a direction which tends to "unwrap" the brake band from the drum thereby releasing the brake lock on the drum.

When the load has been raised to the desired height, the lever is swung back to the left to neutral position to release the clutch, but the brake will remain set to hold the load. If the load is now to be moved down, the control lever is swung further toward the left from the neutral position for application of the brake to control the down movement of the load. Thus, the operator can accurately control the load movement by manipulation of the control lever to opposite sides of the neutral position. The spring 104 acts on the lever to maintain it in neutral position.

When a control lever is swung to neutral position and then beyond, the brake will first be set and then the clutch will be brought into driving engagement, and then upon reverse swing of the lever into neutral position and then beyond, the clutch will be disengaged before release of the brake and at the end of the reverse swing of the lever both the brake and the clutch will be disengaged. The control for both the assemblies A and B is the same, both control levers swinging in the same direction for the same control.

By means of the adjustable links 106 between the control lever operated cam mechanism and the brake mechanism, adjustment can be made of the brake releasing mechanism independently of the control lever positions, and the positions of the control levers can be adjusted without affecting adjustment of the brake release mechanism. The lever, cam and brake adjustments can readily be made at the exterior of the winch structure.

The adjustment for setting of the clutch or for compensating for wear is accessible at the outer ends of the cable drum structures, such adjustment being accomplished by turning of the cap 73 for axial setting of the screw ring 72 in the clutch hub.

It should be noted that the cable drums and clutch drums are rotatable on anti-friction bearings carried by the tubular bearing walls 39 which walls are fixed and supported by the main frame mounting 18 without loading any moving parts. Likewise the driving gears 38, hollow shafts 37 and clutch heads 59 are rotatable on anti-friction bearings 42, 43 and plain bearings 44 supported in housing parts carried by the main frame without loading any moving parts. A full floating assembly is thereby produced and the stationary frame or housing carries the loads.

We have shown a practical and efficient embodiment of the various features of our invention, but we do not desire to be limited to the exact construction, arrangement and operation shown and described as changes and modifications may be made without departing from the scope of the invention.

We claim as our invention:

1. In a winch including a supporting housing, a drive shaft journalled in and extending from said housing, a cable drum journalled on said housing concentric with and surrounding said drive shaft, said drum at its outer end presenting a clutch surface, a clutch head secured to the outer end of said drive shaft to rotate therewith but being free to shift axially thereon, said drive shaft having an axially extending bore therethrough, and a clutch control shaft extending through said bore, the improvements of a thrust bearing having an inner race fixedly secured to the outer end of said control shaft, said clutch head having a bore at its outer end provided with internal threading, a seating structure in said clutch head bore for said thurst bearing, said thrust bearing having an outer race fixedly secured to said bore by said seating structure, means for effecting axial movement of said control shaft for transmission by said bearing to said clutch head for setting of said head relative to the clutch surface, and said seat structure having threaded engagement with the threading in said head bore whereby said control shaft may be axially adjusted relative to said clutch head.

2. In a winch including a supporting housing, a drive shaft journalled in and extending from said housing, a cable drum journalled on said housing concentric with and surrounding said drive shaft, said drum at its outer end presenting a clutch surface, a clutch head secured to the outer end of said drive shaft to rotate therewith but being free to shift axially thereon, said drive shaft having an axially extending bore therethrough, said clutch head having a bore in its outer end, and a clutch control shaft extending through the bore of said driving shaft, the improvements of a thrust bearing assembly in said clutch head bore connecting said clutch control shaft with said clutch head whereby axial movement of said control shaft will be transmitted to said clutch head for setting thereof relative to said clutch surface, means associated with the inner end of said control shaft for controlling the axial movement thereof, and said bearing assembly having threaded engagement in said clutch head bore whereby upon turning of said structure in said bore said control shaft may be adjusted axially relative to said clutch head.

3. In a winch including a supporting frame, a clutch drive shaft journalled on said frame and extending therefrom, a cable drum journalled on said frame concentric with and surrounding said drive shaft, a clutch drum on said cable drum, a clutch head splined on the outer end of said drive shaft, and a clutch control shaft extending axially through said drive shaft and rotatably coupled at its outer end to said clutch head, the improvements of means affording thread connection between the inner end of said control shaft and said supporting frame whereby rotation of said control shaft will effect axial movement thereof for setting of the clutch head relative to the clutch drum, a control lever on the inner end of said shaft for controlling the rotation thereof, a brake drum on said cable drum and a brake band therefor, a brake shaft and a brake lever thereon, linkage between said brake shaft and the ends of said brake band, a spring engaging said brake lever for rocking thereof and said brake shaft in one direction for operation of said linkage to set the brake band, and cam means between said clutch control shaft and said brake lever so arranged that when said clutch control shaft is rotated in one direction by said control lever said brake spring will be free to rock the brake shaft for setting of the brake, and when said clutch control shaft is rotated by said control lever in the opposite direction said brake lever and brake shaft will be rocked against the force of said spring to release the brake band.

4. In a winch including a supporting frame, a clutch drive shaft journalled on said frame and extending therefrom, a cable drum journalled on said frame concentric with and surrounding said drive shaft, a clutch drum on said cable drum, a clutch head splined on the outer end of said drive shaft, and a clutch control shaft extending axially through said drive shaft and rotatably coupled at its outer end to said clutch head, the improvements of means affording thread connection between the inner end of said control shaft and said supporting frame whereby rotation of said control shaft will effect axial movement thereof for setting of the clutch head relative to the clutch drum, a control lever on the inner end of said shaft for controlling the rotation thereof, a brake drum on said cable drum and a brake band therefor, a brake shaft and a brake lever thereon, linkage between said brake shaft and the ends of said brake band, a spring engaging said brake lever for rocking thereof and said brake shaft in one direction for operation of said linkage to set the brake band, an operating connection between said clutch control shaft and said brake lever comprising a cam arm movable with said clutch control shaft and a cam lever pivoted on said supporting frame and linked to said brake lever, the operation of said connection being such that when said control lever is swung in one direction said brake lever will be free to be rocked by said spring for setting of the brake band, and when said control lever is swung in the opposite direction said cam arm will engage with said cam lever to rock said brake lever in the opposite direction against the force of said spring to positively release the brake band.

5. In a winch including a supporting frame, a clutch drive shaft journalled on said frame and extending therefrom, a cable drum journalled on said frame concentric with and surrounding said drive shaft, a clutch drum on said cable drum, and a clutch head splined on the outer end of said drive shaft, the improvements of a clutch control shaft extending axially through said drive shaft and rotatably coupled at its outer end to said clutch head, means affording thread connection between the inner end of said control shaft and said supporting frame whereby rotation of said control shaft will effect axial movement thereof for setting of the clutch head relative to the clutch drum, a control lever on the inner end of said shaft for controlling the rotation thereof, a brake drum on said cable drum and a brake band therefor, a brake shaft and a brake lever thereon, linkage between said brake shaft and the ends of said brake band, a spring engaging said brake lever for rocking thereof and said brake shaft in one direction for operation of said linkage to set the brake band, and means effective upon swing of said control lever in one direction for rocking said brake lever and shaft against the resistance of said spring for release of the brake band, and for releasing said brake lever upon swing of said control lever in the opposite direction to permit said spring to effect resetting of the brake band.

6. In a winch in which a cable drum has a clutch and a brake, the provision of controlling structure for the clutch and brake comprising a clutch control shaft, a brake shaft and a brake lever thereon, an operating connection between said brake lever and brake, a spring tending to rock said brake lever in one direction for setting of the brake, a control lever for said clutch, and a cam and link connection between said brake lever and said clutch control shaft comprising a cam lever, a link member and a cam engaging arm, said control lever and cam engaging arm each being independently rotatably and axially adjustable on said clutch control shaft, and linear adjustable means on said link member for controlling brake release.

7. In a winch having a supporting housing defining a gear chamber together with an annular bearing extension on the outer side of the housing and a cable drum journalled entirely on said extension, the improvements of a combined clutch and brake drum mounted on the outer end of the cable drum and supported entirely by said cable drum, said combined drum having an inner clutch face and an outer brake face, a drive shaft extending through said annular bearing extension and said gear chamber and journaled at its inner end in said housing, a clutch head slidably splined on the outer end of said shaft for cooperation with the clutch face of said combined drum, a clutch head control rod extending through said drive shaft and rotatably coupled at its outer end for positively pushing and pulling said clutch head, a threaded connection between said control rod and said housing, means for rotating said control rod to cause said threaded connection to shift the rod axially for setting the clutch head relative to the clutch face of said combined drum, and a brake band surrounding the brake face of said combined drum.

8. In a winch in which a cable drum is provided with a brake band, controlling structure for the brake band comprising a brake shaft and a brake lever thereon, a brake band control lever on said brake shaft, a live end link extending from the live end of said brake band and pivoted to said brake band control lever at one side of the axis of said brake shaft, a spring for rocking said brake shaft and said brake band control lever to exert pull on the live end of the brake band for setting of the brake, a dead end link pivoted at one end to the dead end of said brake band and at its other end pivoted to said brake control lever on the opposite side of the brake shaft axis to that of the live end link, said dead end link being curved to clear the brake shaft and being pivoted to the brake control lever beyond the brake shaft so that the brake shaft lies between said pivot and the dead end of the brake band, the pivot connection of the dead end link with the brake band control lever also being outside of a line extending through the brake shaft axis and the pivot connection of the dead end link with the brake band, whereby the additional leverage provided by the dead end link pull will increase as the brake shaft and brake band control lever are rotated by the spring means as the brake friction lining wears during operation of the brake thereby providing increased braking power as the brake friction lining wears.

HARRY H. WASHBOND.
ORVILLE R. BEATTIE.

REFERENCES CITED

The following references are of record in the file of this patent:

UNITED STATES PATENTS

| Number | Name | Date |
|---|---|---|
| 466,158 | Davis | Dec. 29, 1891 |
| 638,185 | Norris | Nov. 28, 1899 |
| 739,843 | Dyer | Sept. 29, 1903 |
| 718,916 | Covell | Jan. 20, 1903 |
| 744,632 | Sedgwick et al. | Nov. 17, 1903 |
| 1,168,716 | Farrell | Jan. 18, 1916 |
| 1,613,925 | Boykin, Jr. | Jan. 11, 1927 |
| 1,976,406 | McGiffert et al. | Oct. 9, 1934 |
| 2,103,541 | Low | Dec. 28, 1937 |
| 2,138,824 | Yount | Dec. 6, 1938 |
| 2,175,383 | Eason | Oct. 10, 1939 |
| 2,178,280 | Hutchins et al. | Oct. 31, 1939 |
| 2,270,507 | Clark | Jan. 20, 1942 |
| 2,272,917 | Lawler | Feb. 10, 1942 |
| 2,286,547 | Hutchins | June 16, 1942 |
| 2,303,020 | Berner | Nov. 24, 1942 |
| 2,321,905 | French | June 15, 1943 |
| 2,334,167 | Allin | Nov. 16, 1943 |